United States Patent
Guerrera

(10) Patent No.: US 6,233,282 B1
(45) Date of Patent: May 15, 2001

(54) METHODS AND APPARATUS FOR PROVIDING REDUCED BIT RATE DIGITAL VIDEO FORMATS

(75) Inventor: Enzo Guerrera, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/062,155

(22) Filed: Apr. 16, 1998

(51) Int. Cl.$^7$ .................................................. H04N 7/12
(52) U.S. Cl. ................................ 375/240.25; 375/240.02
(58) Field of Search ............................. 348/384.1, 390.1, 348/405.1, 441; 375/240, 240.01, 240.02, 240.03, 240.25, 240.21; 386/109, 111; 382/233, 239, 251

(56) References Cited

U.S. PATENT DOCUMENTS

| | | | |
|---|---|---|---|
| 5,021,879 | 6/1991 | Vogel | 358/105 |
| 5,677,734 | 10/1997 | Oikawa et al. | 348/405 |
| 5,757,967 | * 5/1998 | Gonzales | 382/233 |
| 5,887,115 | * 3/1999 | Boyce et al. | 386/129 |
| 6,016,380 | * 1/2000 | Norton | 386/52 |

FOREIGN PATENT DOCUMENTS

| | | | |
|---|---|---|---|
| 0423921A2 | * 4/1991 | (EP) | H04N/7/01 |
| 93/16557 | * 8/1993 | (WO) | H04N/7/173 |

OTHER PUBLICATIONS

R. Jennings, *"Fire on the Wire: The IEEE 1394 High Performance Serial Bus"* © 1995, '96, '97, Rev. Jan. 31, 1997, 70233.2161@compuserv.com, Adaptec, Inc., Milpitas, Ca.

R. Jennings, *"Consumer and Professional Digital Video Recording and Data Formats"*, © 1995, '96, '97, Rev. Jan. 30, 1997, 70233.2161@compuserv.com, Adaptec, Inc., Milpitas, Ca.

* cited by examiner

Primary Examiner—Vu Le
(74) Attorney, Agent, or Firm—Martine Penilla & Kim, LLP

(57) ABSTRACT

The present invention teaches a variety of methods and apparatus for providing reduced bit rate digital video formats. Generally speaking, the present invention decodes digital video data stored in a first, higher bit rate format and then encodes the digital video data into a second fixed bit rate digital video format that is less than the first fixed bit rate digital video format. Several different compression techniques are contemplated. For example, in one embodiment the dc and header information is preserved intact, higher ac frequency information is deleted, and new macroblocks are created for the decoded video segments. The new macroblocks are then assembled into shorter length video segments. Another technique involves quantizing the DC and AC frequency information. Of course, both the high frequency "lopping" and the quantizing techniques can be combined for even further compression. A separate aspect of the present invention teaches a computer implemented method for editing digital video data. According to this aspect, digital video information encoded according to a faster bit rate format is converted into a reduced bit rate digital video format which is then used for the interactive editing process. During the interactive editing process, the computer maintains an edit list of all desired edits. Then, the edit list can be used to automatically implement an editing session upon the digital video information encoded according to the first fixed bit rate data format.

31 Claims, 7 Drawing Sheets

METHODS AND APPARATUS FOR PROVIDING REDUCED BIT RATE DIGITAL VIDEO FORMATS

FIELD OF THE INVENTION

The present invention relates to the fields of digital video data compression and storage. More specifically, the present invention teaches methods and apparatus for providing reduced bit rate digital video formats.

BACKGROUND OF THE INVENTION

The quality of a digital video image is a function of its resolution, which may be measured in pixels per image. As the number of pixels increases, the resolution of the image increases. As the resolution of an image increases, the amount of digital video data required to store or transmit the image correspondingly increases.

To reduce the number of digital bits required to store and/or transmit an image, compression is often performed. By way of background, current video compression techniques include two major categories: entropy processes, or information preserving processes, and information losing, or so called "lossy" processes. Entropy processes such as run length encoding (RLE) introduce no errors in the encoding/decoding process so that the original signal may be reconstructed exactly. Entropy processes tend to have a small compression ratio, i.e., a small reduction in video bit rate. In contrast, "lossy" compression processes tend to introduce errors in the encoding/decoding process but achieve much higher compression ratios. To strike an acceptable compromise between quality and compression ratio, digital video compression processes typically combine both entropy coding processes and "lossy" coding processes.

A variety of standards have emerged in the video industry for digital video compression. Digital Video (DV) is one such compression standard. The DV compression standard is commonly employed for compressing digital video data generated by, for example, a DV camcorder for storage on digital video tape (DV tape). As will be appreciated, DV is similar to the MPEG encoding technique in that it contains both audio and video data. However, while MPEG has intra-frame compression thereby reducing the redundancy from frame-to-frame, DV, like motion JPEG, has only interframe compression. A further important characteristic of the DV format is that DV maintains a fixed bit rate of about 3.5 Mbytes per second.

According to the DV format, each image frame is converted into a plurality of blocks of a suitable size, i.e., blocks of 8 by 8 pixels. In the DV format, two basic forms of a discrete cosine transform (DCT) are used to transform these blocks into frequency domain components, which may then be encoded into a compressed format. These include a still DCT process used for a still type sample block and a motion DCT process used for a motion type sample block. For simplicity's sake, the following description is limited to the still type sample block.

FIG. 1 represents diagramatically a DCT based video encoding process for a still type 8×8 video sample block 108. The still type 8×8 sample block 108 includes sixty-four (64) samples 110. In the DV format, the still type 8×8 sample block 108 is transformed, using a DCT function, into an 8×8 DCT block 112. The 8×8 DCT block 112 has 64 spatial frequency patterns including a DC spatial frequency pattern 114 and 63 AC spatial frequency patterns 116.

The DC spatial frequency pattern 114 is located in row zero, column zero of the 8×8 DCT block 112. The DC spatial frequency pattern 114 has a DC coefficient value and each of the 63 AC spatial frequency patterns 116 has an AC coefficient value. The DC coefficient value of the DCT block 112 is equal to the average of each of the AC coefficient values of the DCT block 112.

In order to achieve the required bit rate yet optimize picture quality and integrity, the DCT blocks of each image frame in the DV format are encoded into a plurality of fixed length video segments, the video segments each comprising five compressed macroblocks and certain header information. As will be appreciated, each compressed macroblock (CMB) represents a discrete portion of the frame.

FIG. 2 illustrates a typical CMB 120. The CMB 120 includes header information 122, four luminance DCT blocks Y0, Y1, Y2, and Y3 and two chrominance DCT blocks Cr and Cb. The luminance and chrominance blocks have been transformed by a DCT function as described above with reference to FIG. 1. Further, to achieve the fixed data bit rate of 3.5 Mbytes described above, the luminance DCT blocks Y0, Y1, Y2, and Y3 each have a predefined storage capacity of 14 bytes, 100 bits of which is dedicated to AC frequency values, and the chrominance DCT blocks Cr and Cb each have a predefined storage capacity of 10 bytes, 68 bits of which is dedicated to AC frequency values.

To create the video segment, a shuffling process first selects five CMBs such as CMB 120. As will be appreciated by those skilled in the art, shuffling means that five discrete CMB from roving positions on the frame are selected, one from the center portion of the frame, and the other four from the frame's four corners, respectively. Next, the values of the DCT blocks are "quantized," that is, each value of the DCT matrix is divided by a predetermined number. Because certain frequencies may not appear in the block, or may have small values, the quantized value is often zero. It should be noted that this is a lossy compression method, since every time you quantize you are likely to lose information.

After quantization, the DV format encoding process implements a run length encoding (RLE) compression technique. In the DV format, specific RLE codes are used to compress a digital video bit stream by taking advantage of repetitive patterns of zeros and ones. After implementing the RLE compression, the RLE data is distributed throughout each video segment according to a protocol that takes advantage of any additional space available within the various CMBs. Specifically, the RLE data is distributed throughout the video segment using three passes. In the first pass, RLE data is stored in the allotted areas for each DCT block in a video segment. The second pass finds unused areas in each CMB 120 and stores further RLE bits into those areas. The third pass finds any free space in the video segment and stores any remaining RLE bits in that space until the space runs out or until there are no more bits left.

The DV compression factor is thus a function of the quantization value. DV utilizes this by adjusting the quantization factor for each video frame in order to obtain the fixed bit rate of 3.5 Mbytes per second.

Although the DV format is an immensely popular digital video format, three problems arise under the current DV format. First, the 3.5 Mbyte fixed data rate pushes or exceeds the limit for many computer systems. This results primarily because the storage medium (e.g., the hard disk drive) cannot read or write at the fixed data rate. Second, the DV format is space intensive, requiring significant storage capabilities for working with the data. Third, decompression and compression of the DV data is prohibitively slow, making it difficult for video editors to work with the data unless they have a powerful computing system.

What is needed is a technique for converting, real time, back and forth between DV format and a lower, reduced bit rate (less resolution) digital video compression format. Such a conversion technique would enable the use of video equipment that adheres to the DV formnat together with computer systems that cannot handle the DV data rate.

SUMMARY OF THE INVENTION

In order to achieve the foregoing objectives, the present invention teaches a variety of methods and apparatus for providing reduced bit rate digital video formats. A first method of the present invention teaches encoding digital video data into a second fixed bit rate digital video format that is slower than a first fixed bit rate digital video format in which the digital video data was initially encoded. More specifically, the method retrieves at least one data frame encoded according to the first fixed bit rate digital video format. The at least one data frame has a plurality of encoded first length video segments, and each of these encoded first length video segments has a fixed first length. Next, each of the plurality of encoded first length video segments are decoded into a plurality of decoded video segments. Finally, the decoded video segments are encoded according to the second fixed bit rate digital video format. The result is a plurality of encoded second length video segments each having a fixed second length smaller than the fixed first length.

In certain embodiments, the decoded video segments each include a plurality of macroblocks having header information and a plurality of blocks with both dc frequency information and ac frequency information. In these embodiments, a variety of compression encoding techniques are contemplated. In one technique, the dc and header information is preserved intact, higher ac frequency information is deleted, and new macroblocks are created for each particular decoded video segment. The new macroblocks are then assembled into an encoded second length video segment from the plurality of new macroblocks. Another technique involves quantizing the DC and AC frequency information. Of course, both the high frequency "lopping" technique and the quantizing technique can be combined for even further compression.

A separate aspect of the present invention teaches a computer implemented method for editing digital video data. According to this aspect, digital video information encoded according to a faster bit rate format is converted into a reduced bit rate digital video format which is then used for the interactive editing process. During the interactive editing process, the computer maintains an edit list of all desired edits. Then, the edit list can be used to automatically implement an editing session upon the digital video information encoded according to the first fixed bit rate data format.

Other embodiments of the present invention teach apparatus for implementing methods such as those described above, as well as a variety of computer readable medium storing computer executable instructions for related methods.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE INVENTION

In brief, the present invention teaches retrieving a standard DV data frame (e.g., 120,000 bytes for NTSC/144,000 bytes for PAL) into system memory, converting the retrieved frame into a low-bit rate DV data frame, then storing the low-bit rate DV data frame.

Figure 1:
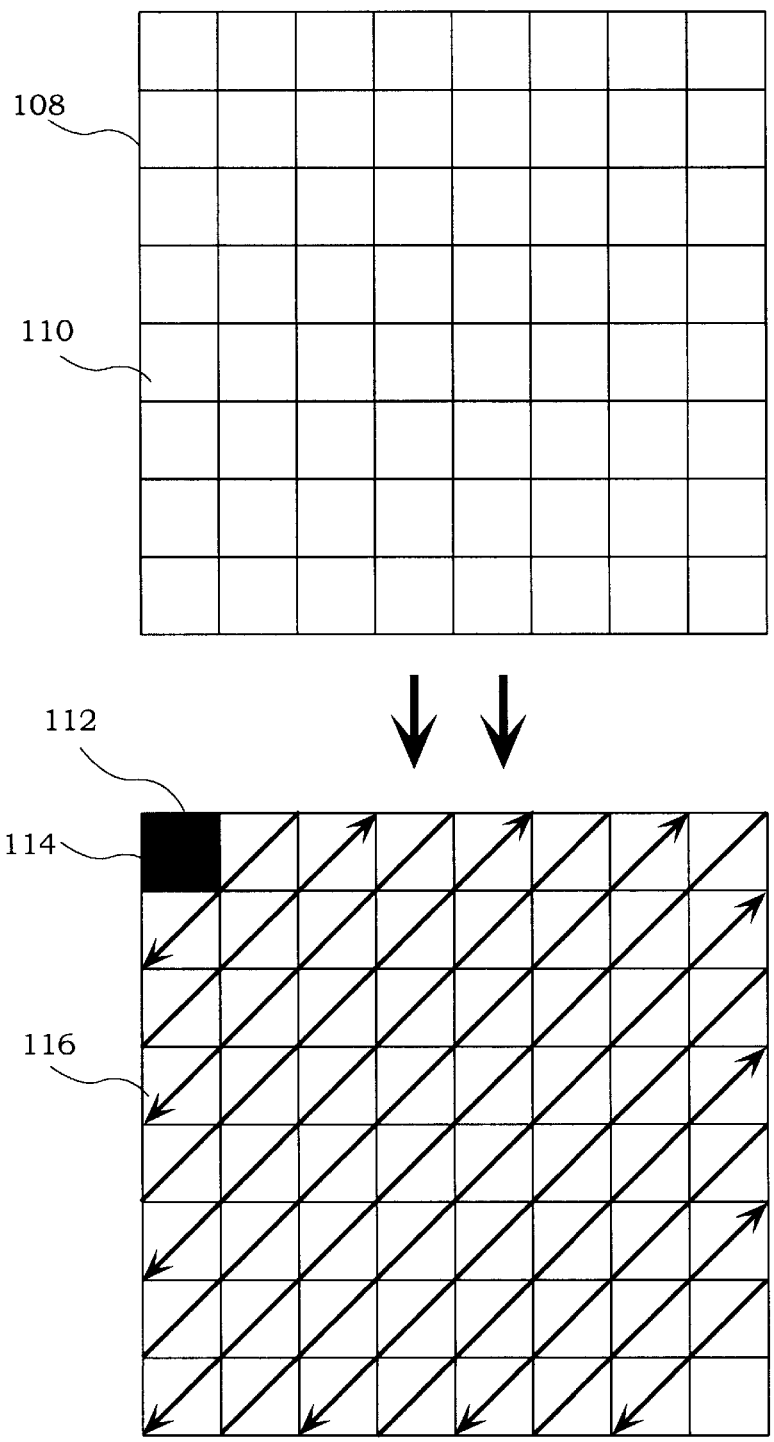
FIG. 1 is a diagram representing a DV format DCT based video encoding process for an 8×8 still type sample block.
Figure 2:
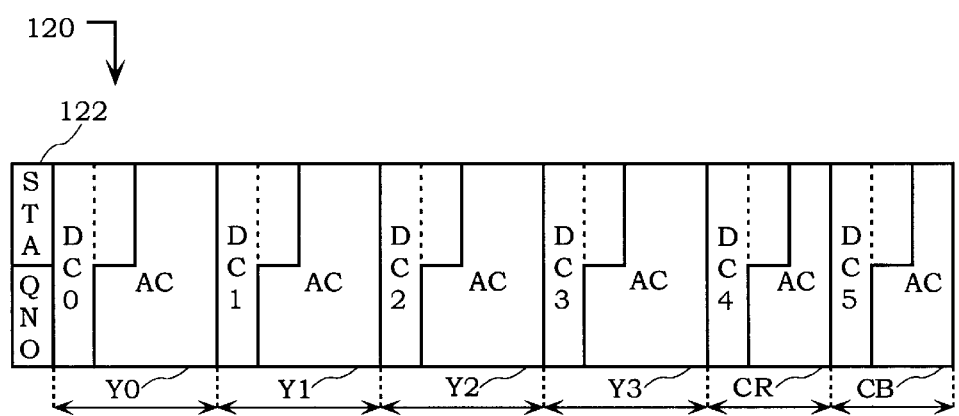
FIG. 2 is a diagram of a compressed macroblock of the prior art.
Figure 3:
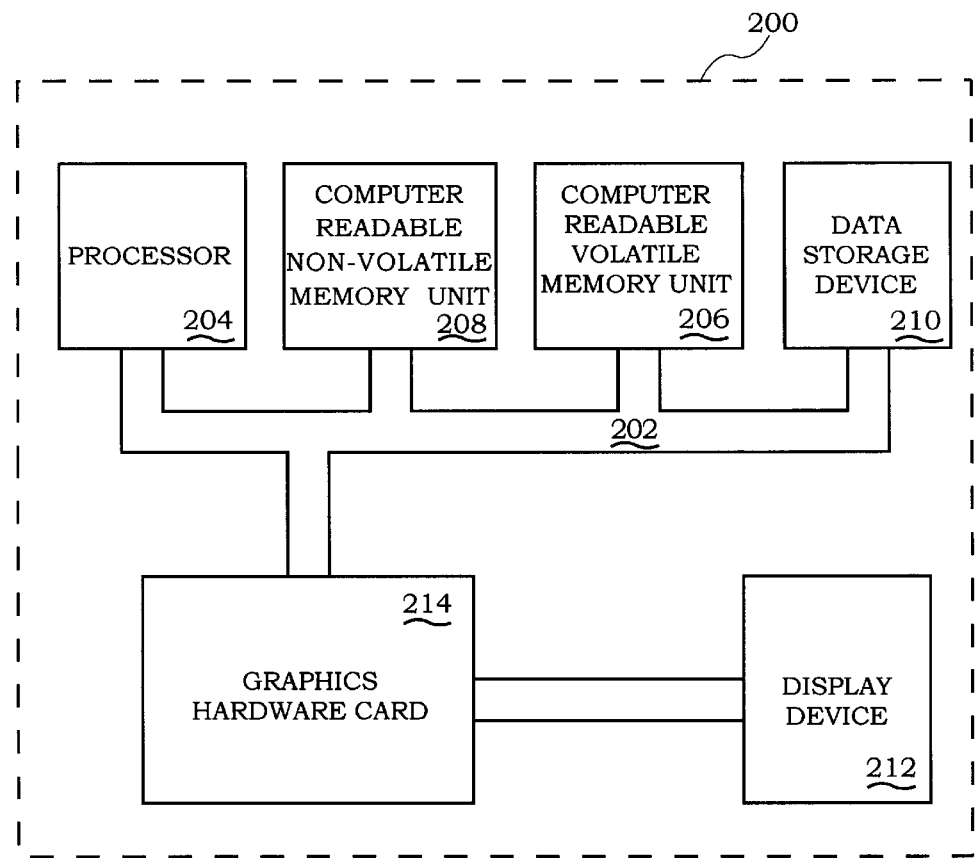
FIG. 3 is a diagram of a computer system suitable for implementing a the methods of the present invention.

With reference to FIG. 3, a computer system 200 in accordance with one embodiment of the present invention will now be described. The computer system 200 includes a bus 202 for communicating information, a processor 204 coupled with the bus 202 for processing information and instructions, a computer readable volatile memory unit 206 (e.g., random access memory unit) coupled with the bus 202 for storing information and instructions for the processor 204, a computer readable non-volatile memory unit 208 (e.g., read only memory unit) coupled with the bus 202 for storing static information and instructions for the processor 204, a data storage device 210 such as a magnetic or optical disk and disk drive coupled with the bus 202 for storing information and instructions. The computer readable volatile memory unit 206, computer readable non-volatile memory unit 208, and data storage device 210 provide examples of a computer storage medium suitable for storing program instructions for implementing method aspects of the present invention.

The computer system 200 also includes a display device 212 coupled to the bus 202, for displaying information to the computer user, and a graphics hardware card 214 coupled to the bus 202. The graphics hardware card 214 may contain a display processor which executes a series of display instructions found within a display list. The processor 204 or display processor supplies data and control signals to a frame buffer which refreshes the display device 212 for rendering images on the display device 212.

Figure 4:
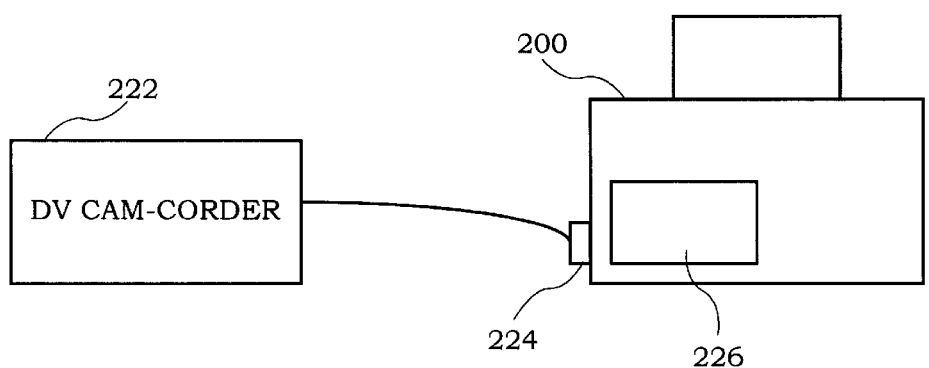
FIG. 4 is a diagram of a DV camcorder coupled to the computer system for implementing the methods of the present invention.

FIG. 4 illustrates a suitable DV camcorder 222 connected to the computer system 200 of FIG. 3 via a cable and a connector 224. The computer system 200 may include a DV plug in board 226 which is used to interface the DV camcorder 222 to the computer system 200. The DV camcorder 222 provides DV standard format encoded data to the computer system 200.

Figure 5:
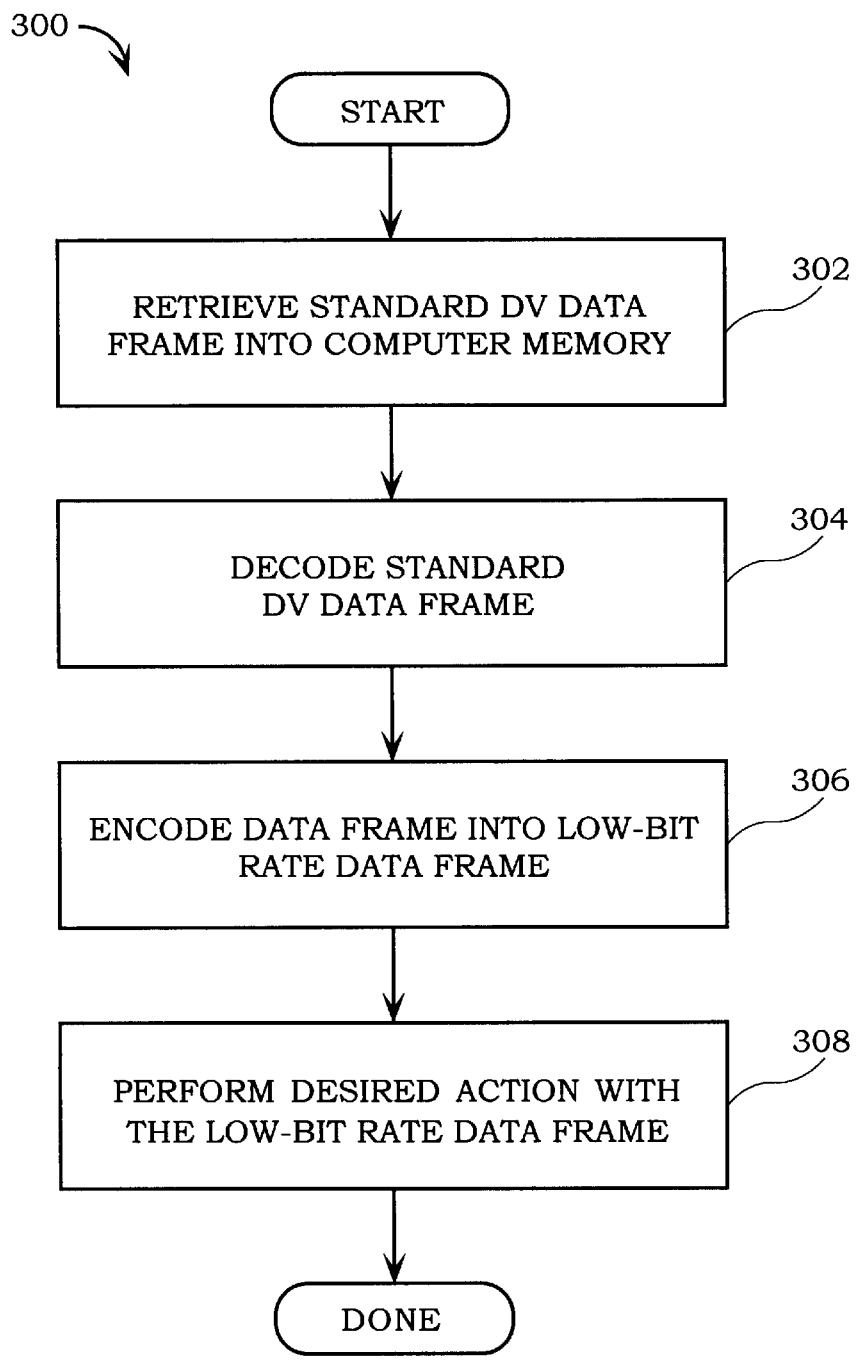
FIG. 5 is a flow chart illustrating a computer implemented method for providing a reduced bit rate data format in accordance with one aspect of the present invention.

Turning next to FIG. 5, a computer implemented method 300 for providing digital video data of a reduced bit rate digital video format from digital video data encoded according to the standard DV format will now be described. In a step 302, a standard DV data frame is retrieved into computer system memory. The DV data frame may arise from any suitable source. For example, the retrieval step 302 may involve reading the standard DV frame from storage, e.g., from the data storage device 210. Also, the retrieval step 302 may represent receiving DV data as produced during real-time recording with or play-back by the DV camcorder 222. In any event, the encoded DV data frame is decoded in a next step 304. The decoding step 304 places the DV data into a format that enables further manipulation. In a step 306, the decoded data frame is encoded into a reduced bit rate data format. Two preferred methods for performing step 306 are described below with reference to FIGS. 6 and 7. Then, in a step 308, a desired action is performed with the reduced bit rate data frame produced in step 306. For example, the reduced bit rate data frame may be edited or written out to the data storage device 210.

Figure 6:
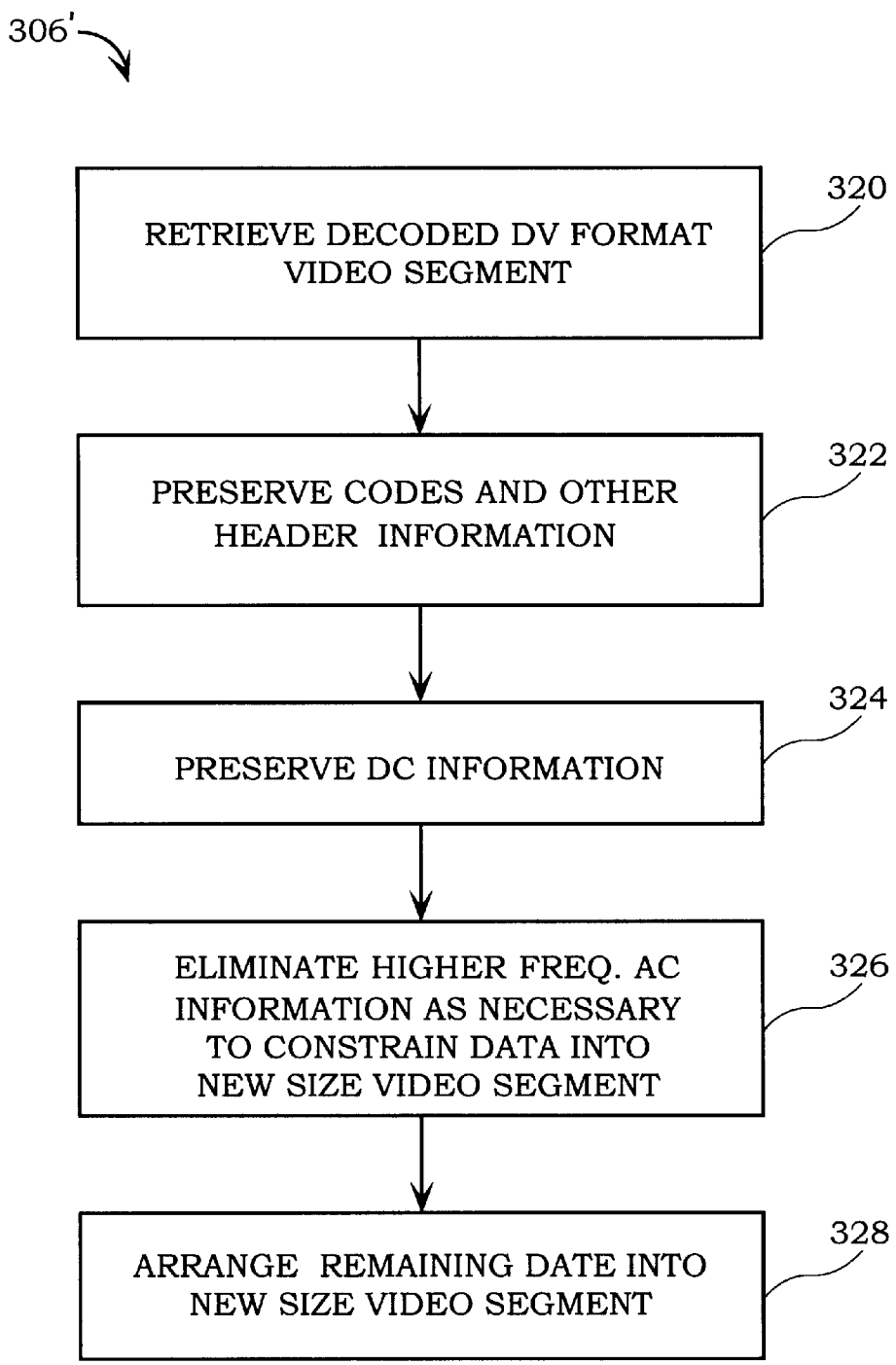
FIG. 6 is a flow chart illustrating one suitable method for encoding digital video data into a reduced bit rate format in accordance with another aspect of the present invention.

FIG. 6 is a flow chart illustrating one computer implemented method 306' suitable for implementing the encoding step 306 of FIG. 5. The method 306' operates by suitably reducing the data length of each video segment in the retrieved data frame. An initial step 320 retrieves a particular decoded DV format video segment. A next step 322 preserves the code and other header information present in the video segment. Similarly, a step 324 preserves the DC frequency information found in each of the CMBs in the particular video segment. Those of skill in the art will appreciate that generally the DC frequency information is the most important for providing a quality picture, therefore it is preferable not to subject the DC frequency information to lossy compression techniques.

Process control continues as a step 326 goes through the video segment and deletes the higher frequency information as necessary to constrain the video data into a new size video segment. For example, one embodiment of the present invention contemplates a fifty percent (50%) reduction in the capacity of the AC frequency portion, e.g., from 100 bits to 50 bits. Hence, the amount of higher frequency information eliminated depends upon the size constraints of the reduced bit rate format video segment. Then, a step 328 arranges the remaining video data into a reduced bit rate format video segment. Step 328 may include run length encoding (RLE) the CMBs, and then distributing the RLE data within the video segment according to the three-pass protocol described earlier. The method 306' of FIG. 6 is then performed for each video segment found in the present data frame, thereby generating a data frame suitable for use in a reduced bit rate encoding format.

Figure 7:
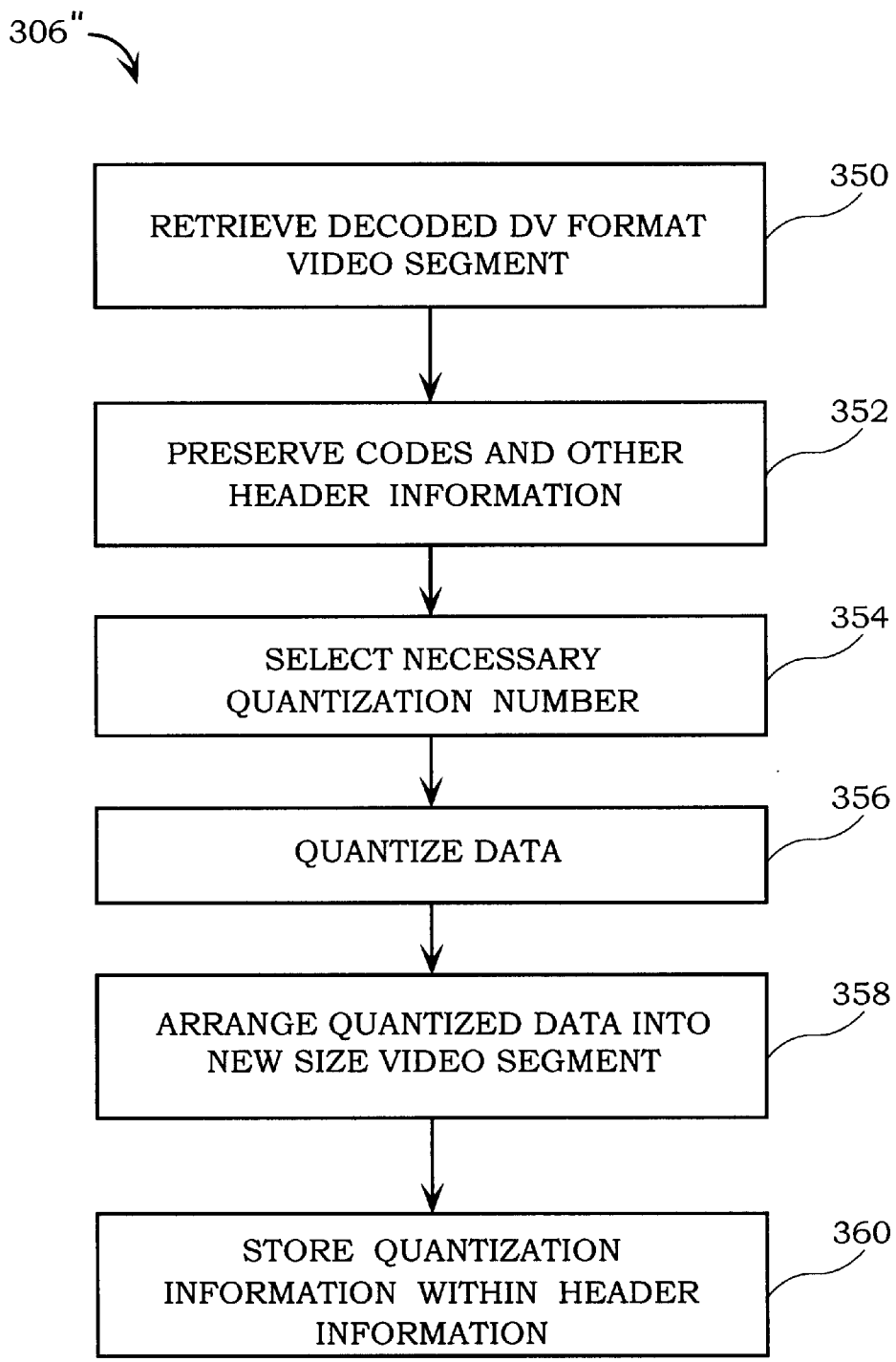
FIG. 7 is a flow chart illustrating another suitable method for encoding digital video data into a reduced bit rate format in accordance with another aspect of the present invention.

Turning next to FIG. 7, a computer implemented method 306" suitable for implementing the step 306 of FIG. 5 in accordance with another embodiment of the present invention will now be described. The method 306" reduces the data length of each video segment in the retrieved data frame by further quantizing the available information. An initial step 350 retrieves a particular decoded DV format video segment. A next step 352 preserves the code and other header in formation present in the video segment. A step 354 selects the quantization number necessary for constraining the digital video data to the reduced bit rate format video segment. Then, a step 356 quantizes the frequency data. Note that in certain embodiments both th e DC and AC frequency values will be quantized. However, it is also contemplated that in certain embodiments, only the AC frequency values will be quantized, thus maintaining the DC values at a higher level of precision. Once the frequency data has been quantized, a step 358 arranges the quantized data into a smaller reduced bit rate format video segment. Step 358 may include run length encoding (RLE) the CMBs, and the n distributing the RLE data within the video segment according to the three-pass protocol described earlier. Finally, a step 360 stores quantization information within the video segment header for later decoding purposes. The method 306" of FIG. 7 is then performed for each video segment found in the present data frame, thereby generating a data frame suitable for use in a reduced bit rate encoding format.

Yet another embodiment of the present invention contemplates combining the methods of FIGS. 6 and 7. That is, another compression method could involve both elimination of certain higher AC frequency components, followed by a quantization step.

As will be appreciated, the above described techniques enable a user whose computer system is not capable of keeping up with the 3.5 Mbyte bit rate of standard DV format to still utilize a standard DV format camcorder in real time, with a corresponding decrease in resolution. Another application for the present invention can be found in the professional video editing field. Specifically, the methods of the present invention can be used to download and edit DV images without the storage space and computing speed the standard DV format on the edit system. Instead, the operator can perform the edits in the reduced data rate DV format. The program will create an edit decision list tracking all the edits such as cutting, special effects, titling, etc., made by the operator. Once completed, the operator can implement a process for performing the operations on the edit decision list with the high resolution standard DV format.

Figure 8:
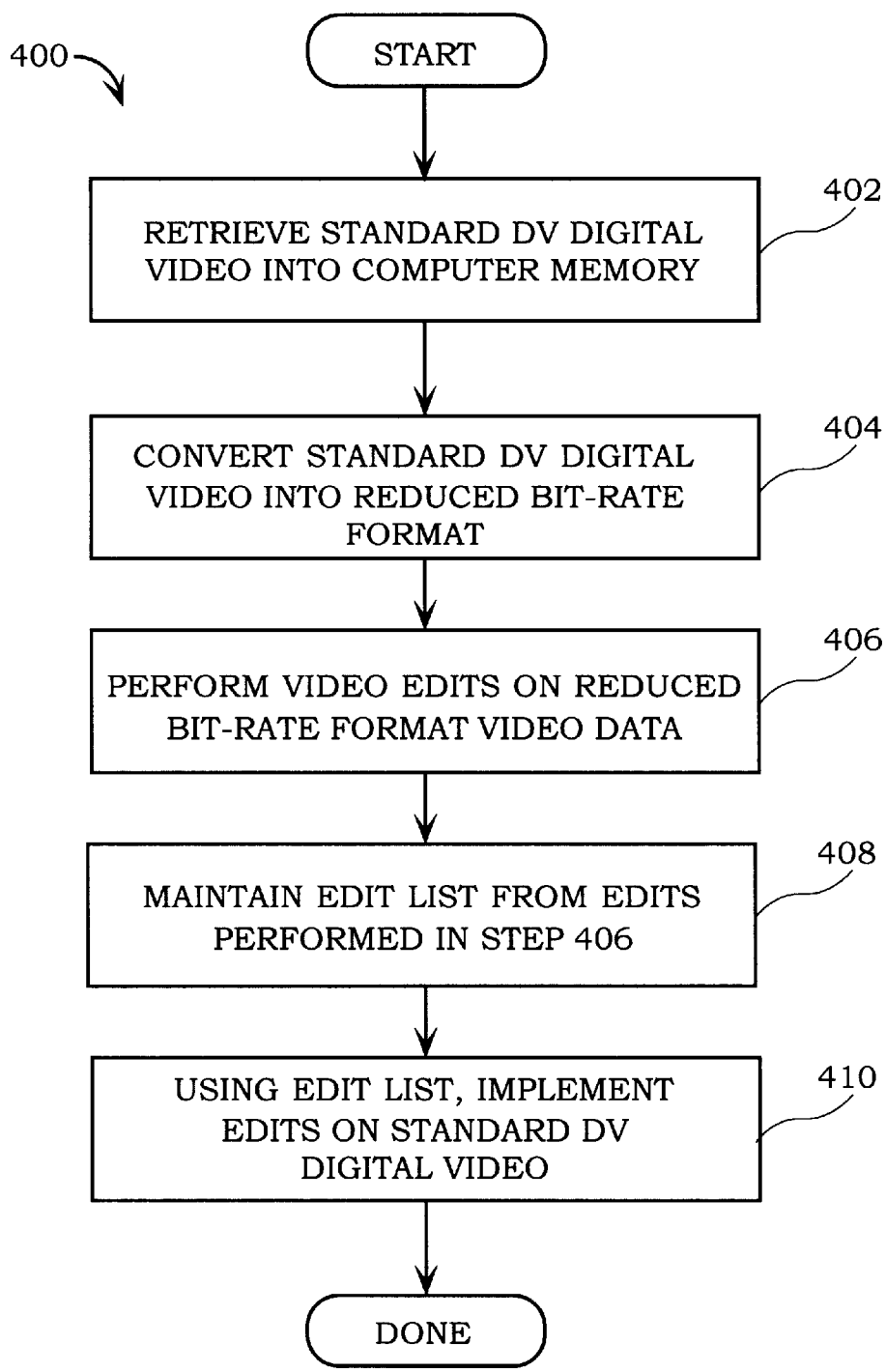
FIG. 8 is a flow chart illustrating a method for accomplishing video editing in accordance with still another aspect of the present invention.

FIG. 8 provides a flow chart illustrating a computer implemented method 400 for editing standard DV format digital video information within the reduced bit rate format. In steps 402 and 404, the DV format digital video information is retrieved and converted into the reduced bit rate format. The reduced bit rate format will provide the video editor an editing environment that is in some ways superior to the editing environment of the DV format. For example, editing within the reduced bit rate format environment requires less storage space for complicated editing operations. Additionally, decoding the reduced bit rate format is a faster process. The primary disadvantage is the decreased quality of the reduced bit rate format, but if the reduced bit rate is properly selected, the quality will be sufficient for editing. In any event, in a step 406, the user performs the video edits upon the reduced bit rate format digital video date. In a corresponding step 408, the computer system maintains an edit list tracking all the edits performed in the edit step 406. Then, in a step 410, the edit list is used to implement the desired edits on the higher quality, standard DV format digital video. Step 410 can be performed automatically without user interference. This allows the user to perform other tasks while the edits to the final version are being completed.

Although only a few embodiments of the present invention have been described, it should be understood that the present invention may be embodied in many other specific forms without departing from the spirit or scope of the invention. Therefore, the present examples are to be considered as illustrative and not restrictive, and the invention is not to be limited to the details given herein, but may be modified within the scope of the appended claims.

I claim:

1. A computer implemented method for providing digital video data encoded according to a second fixed bit rate digital video format from digital video data encoded according to a first fixed bit rate digital video format, wherein the first fixed bit rate digital video format is faster than the second fixed bit rate digital video format, the method comprising the acts of:

retrieving at least one data frame encoded according to the first fixed bit rate digital video format, the at least one data frame including a plurality of encoded first length video segments, each of the plurality of encoded first length video segments having a fixed first length;

decoding each of the plurality of encoded first length video segments thereby generating a plurality of decoded video segments; and encoding each of the decoded video segments according to the second fixed bit rate digital video format thereby creating a plurality of encoded second length video segments, each of the plurality of encoded second length video segments having a fixed second length being smaller than the fixed first length.

2. A computer implemented method as recited in claim 1 wherein a decoded video segment includes a plurality of macroblocks, each macroblock having header information and a plurality of blocks having dc frequency information and ac frequency information.

3. A computer implemented method as recited in claim 2 wherein the act of encoding each of the decoded video segments includes the following acts:

for each particular decoded video segment,
  a) selecting an unprocessed macroblock from the particular decoded video segment,
  b) preserving the header information and the dc frequency information located within the selected macroblock;
  c) deleting higher frequency ac frequency information from the selected macroblock;
  d) forming a new macroblock including the preserved header information, the dc frequency information, and the remaining ac frequency information;
  e) repeating acts a)–d) until all macroblocks for the particular decoded video segment have been processed; and
  f) assembling an encoded second length video segment from the plurality of new macroblocks created by the performance of acts a)–e).

4. A method as recited in claim 3 further including an act of run length encoding each of the processed macroblocks prior to performing act f).

5. A method as recited in claim 3 where in the act f) of assembling an encoded second length video segment includes the act of:

for each of the plurality of new macroblocks within the encoded second length video segment,
  i) for each data block found within a processed macroblock, storing data in its allocated area within the block; and
  ii) subsequent to i), storing extra data from each block of the processed macroblock in space remaining within the processed macroblock, and storing extra data remaining from acts i)–ii) anywhere space is available within the encoded second length video segment.

6. A method as recited in claim 3 wherein, prior to performing the act f) of assembling an encoded second length video segment, the method further includes the act of quantizing the DC and AC frequency information.

7. A method as recited in claim 2 wherein the act of encoding each of the decoded video segments includes the following acts:

a) determining a quantization number necessary for reducing the data size of the at least one frame in order to achieve the second fixed bit rate format;
b) in accordance with the determined quantization number, quantizing the dc and ac frequency information found in the plurality of macroblocks;
c) creating new macroblocks by run length encoding the quantized macroblocks; and
d) assembling an encoded second length video segment from the plurality of new macroblocks created by the performance of acts a)–c).

8. A method as recited in claim 7 wherein the act of d) assembling an encoded second length video segment includes the acts of:

for each of the plurality of new macroblocks within the encoded second length video segment,
  i) for each data block found within a new macroblock, storing data in its allocated area within the block; and
  ii) subsequent to i), storing extra data from each block of the new macroblock in space remaining within the new processed macroblock, and storing extra data remaining after performing acts i)–ii) anywhere space is available within the encoded second length video segment.

9. A computer implemented method for editing digital video data, the method comprising the acts of:

retrieving digital video information encoded according to a first fixed bit rate data format;

converting the digital video information into a second fixed bit rate data format, the first fixed bit rate data format being faster than the second fixed bit rate data format;

manually editing the converted digital video information;

maintaining an edit list of the edits performing in the act of editing the converted digital video information; and automatically editing the digital video information encoded according to the first fixed bit rate data format in accordance with the edit list.

10. A computer implemented method as recited in claim 9, wherein the act of converting the digital video information into a second fixed bit rate data format includes the acts of:

retrieving at least one data frame encoded according to the first fixed bit rate data format, the at least one data frame including a plurality of encoded first length video segments, each of the plurality of encoded first length video segments have a fixed first length;

decoding each of the plurality of encoded first length video segments thereby generating a plurality of decoded video segments; and encoding each of the decoded video segments according to the second fixed bit rate data format thereby creating a plurality of encoded second length video segments, each of the plurality of encoded second length video segments having a fixed second length being smaller than the fixed first length.

11. A computer implemented method as recited in claim 10 wherein a decoded video segment includes a plurality of macroblocks, each macroblock having header information and a plurality of blocks having dc frequency information and ac frequency information.

12. A computer implemented method as recited in claim 11 wherein the act of encoding each of the decoded video segments includes the following acts:

for each particular decoded video segment,
  a) selecting an unprocessed macroblock from the particular decoded video segment, b) preserving the header information and the dc frequency information located within the selected macroblock;
c) deleting higher frequency ac frequency information from the selected macroblock;
d) forming a new macroblock including the preserved header information, the dc frequency information, and the remaining ac frequency information; and
e) repeating acts a)–d) until all macroblocks for the particular decoded video segment have been processed; and
f) assembling an encoded second length video segment from the plurality of new macroblocks created by the performance of acts a)–e).

13. A method as recited in claim 12 further including an act of run length encoding each of the processed macroblocks prior to performing act f).

14. A method as recited in claim 12 wherein the act f) of assembling an encoded second length video segment includes the act of:
for each of the plurality of new macroblocks within the encoded second length video segment,
i) for each data block found within a processed macroblock, storing data in its allocated area within the block; and
ii) subsequent to i), storing extra data from each block of the processed macroblock in space remaining within the processed macroblock, and
storing extra data remaining from acts i)–ii) anywhere space is available within the encoded second length video segment.

15. A method as recited in claim 12 wherein, prior to performing the act f) of assembling an encoded second length video segment, the method further includes the act of quantizing the DC and AC frequency information.

16. A method as recited in claim 11 wherein the act of encoding each of the decoded video segments includes the following acts:
a) determining a quantization number necessary for reducing the data size of the at least one frame in order to achieve the second fixed bit rate format;
b) in accordance with the determined quantization number, quantizing the dc and ac frequency information found in the plurality of macroblocks;
c) creating new macroblocks by run length encoding the quantized macroblocks; and
d) assembling an encoded second length video segment from the plurality of new macroblocks created by the performance of acts a)–c).

17. A method as recited in claim 16 wherein the act of d) assembling an encoded second length video segment includes the acts of:
for each of the plurality of new macroblocks within the encoded second length video segment,
i) for each data block found within a new macroblock, storing data in its allocated area within the block; and
ii) subsequent to i), storing extra data from each block of the new macroblock in space remaining within the new processed macroblock, and
storing extra data remaining after performing acts i)–ii) anywhere space is available within the encoded second length video segment.

18. A computer readable medium storing computer executable instructions for providing digital video data encoded according to a second fixed bit rate digital video format from digital video data encoded according to a first fixed bit rate digital video format, wherein the first fixed bit rate digital video format is faster than the second fixed bit rate digital video format, the computer executable instructions suitable for:
retrieving at least one data frame encoded according to the first fixed bit rate digital video format, the at least one data frame including a plurality of encoded first length video segments, each of the plurality of encoded first length video segments having a fixed first length;
decoding each of the plurality of encoded first length video segments thereby generating a plurality of decoded video segments; and
encoding each of the decoded video segments according to the second fixed bit rate digital video format thereby creating a plurality of encoded second length video segments, each of the plurality of encoded second length video segments having a fixed second length being smaller than the fixed first length.

19. A computer readable medium as recited in claim 18 wherein a decoded video segment includes a plurality of macroblocks, each macroblock having header information and a plurality of blocks having dc frequency information and ac frequency information.

20. A computer readable medium as recited in claim 19 wherein the computer executable instruction for encoding each of the decoded video segments includes the instructions for:
for each particular decoded video segment,
a) selecting an unprocessed macroblock from the particular decoded video segment,
b) preserving the header information and the dc frequency information located within the selected macroblock;
c) deleting higher frequency ac frequency information from the selected macroblock;
d) forming a new macroblock including the preserved header information, the dc frequency information, and the remaining ac frequency information; and
e) repeating acts a)–d) until all macroblocks for the particular decoded video segment have been processed; and
f) assembling an encoded second length video segment from the plurality of new macroblocks created by the performance of acts a)–e).

21. A computer readable medium as recited in claim 20 further including a computer executable instruction for run length encoding each of the processed macroblocks prior to performing act f).

22. A computer readable medium as recited in claim 20 wherein the computer readable instruction f) of assembling an encoded second length video segment includes the act of:
for each of the plurality of new macroblocks within the encoded second length video segment,
i) for each data block found within a processed macroblock, storing data in its allocated area within the block; and
ii) subsequent to i), storing extra data from each block of the processed macroblock in space remaining within the processed macroblock, and
storing extra data remaining from acts i)–ii) anywhere space is available within the encoded second length video segment.

23. A computer readable medium as recited in claim 20 wherein, prior to executing the instruction f) of assembling an encoded second length video segment, the method further includes the act of quantizing the DC and AC frequency information.

24. A computer readable medium as recited in claim 19 wherein the computer executable instruction for encoding each of the decoded video segments includes the following computer executable instructions for:
   a) determining a quantization number necessary for reducing the data size of the at least one frame in order to achieve the second fixed bit rate format;
   b) in accordance with the determined quantization number, quantizing the dc and ac frequency information found in the plurality of macroblocks;
   c) creating new macroblocks by run length encoding the quantized macroblocks; and
   d) assembling an encoded second length video segment from the plurality of new macroblocks created by the performance of computer executable instructions a)–c).

25. A computer readable medium as recited in claim 24 wherein the computer executable instruction for d) assembling an encoded second length video segment includes computer executable instructions for:
   for each of the plurality of new macroblocks within the encoded second length video segment,
      i) for each data block found within a new macroblock, storing data in its allocated area within the block; and
      ii) subsequent to i), storing extra data from each block of the new macroblock in space remaining within the new processed macroblock, and
   storing extra data remaining after performing acts i)–ii) anywhere space is available within the encoded second length video segment.

26. A computer system operable for providing digital video data encoded according to a second fixed bit rate digital video format from digital video data encoded according to a first fixed bit rate digital video format, wherein the first fixed bit rate digital video format is faster than the second fixed bit rate digital video format, the computer system comprising:
   a processor;
   random access memory (RAM) coupled to the processor;
   a computer readable memory coupled to the processor;
   means for retrieving at least one data frame encoded according to the first fixed bit rate digital video format, the at least one data frame including a plurality of encoded first length video segments, each of the plurality of encoded first length video segments having a fixed first length;
   means for decoding each of the plurality of encoded first length video segments thereby generating a plurality of decoded video segments; and
   means for encoding each of the decoded video segments according to the second fixed bit rate digital video format thereby creating a plurality of encoded second length video segments, each of the plurality of encoded second length video segments having a fixed second length being smaller than the fixed first length.

27. A computer system as recited in claim 26 wherein a decoded video segment includes a plurality of macroblocks, each macroblock having header information and a plurality of blocks having dc frequency information and ac frequency information.

28. A computer system as recited in claim 27 wherein the means for encoding each of the decoded video segments includes the following:
   means responsive to each particular decoded video segment including,
      a) means for selecting an unprocessed macroblock from the particular decoded video segment,
      b) means for preserving the header information and the dc frequency information located within the selected macroblock;
      c) means for deleting higher frequency ac frequency information from the selected macroblock;
      d) means for forming a new macroblock including the preserved header information, the dc frequency information, and the remaining ac frequency information; and
      e) means for activating the means of a)–d) until all macroblocks for the particular decoded video segment have been processed; and
      f) means for assembling an encoded second length video segment from the plurality of new macroblocks created by the performance of acts a)–e).

29. A computer system as recited in claim 28 wherein the means responsive to each decoded video segment is further operable to perform run length encoding on each of the processed macroblocks prior to assembling the encoded second length video segment.

30. A computer system as recited in claim 28 wherein the assembling means includes:
   means responsive to each of the plurality of new macroblocks within the encoded second length video segment, including,
      i) for each data block found within a processed macroblock, means for storing data in its allocated area within the block; and
      ii) means for storing extra data from each block of the processed macroblock in space remaining within the processed macroblock, and
   means for storing extra data remaining after the operation of the means i) and ii) anywhere space is available within the encoded second length video segment.

31. A computer system as recited in claim 28 further comprising means for quantizing the DC and AC frequency information prior to invoking the means for assembling an encoded second length video segment.

* * * * *